May 2, 1961 C. GREBEL 2,982,839
ELECTRIC CIGARETTE LIGHTERS
Filed March 18, 1960
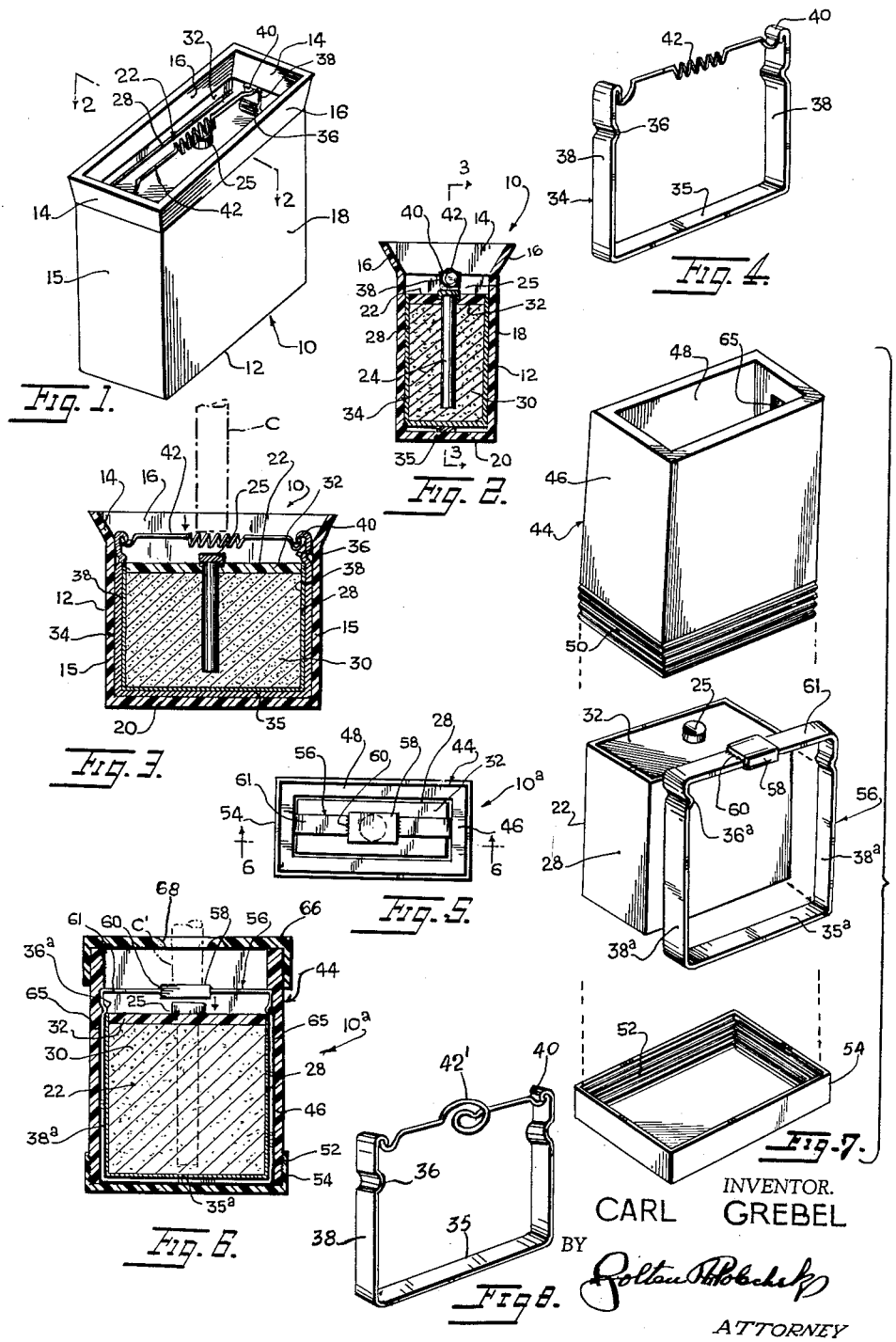
INVENTOR.
CARL GREBEL
BY
ATTORNEY United States Patent Office 2,982,839
Patented May 2, 1961

2,982,839
ELECTRIC CIGARETTE LIGHTERS
Carl Grebel, 514 Madison Ave., New York, N.Y.
Filed Mar. 18, 1960, Ser. No. 16,056
9 Claims. (Cl. 219—32)

This invention concerns an electric cigarette lighter.

Conventional cigarette lighters which employ combustible liquid fuel are widely used and have the feature of producing a flame instantly. It has been found, however, that such instant lighters present many difficulties and disadvantages since the fuel requires frequent replacement; they are subject to leakage; complex mechanisms are required for igniting the fuel; the use of an open flame presents a safety hazard, etc. The use of matches to light cigarettes presents other obvious disadvantages and hazards. The use of a match or fuel lighter adversely affects the flavor and aroma of the cigarette due to the odorous gases of combustion emitted by the match or lighter while lighting the cigarette.

The present invention is directed at overcoming the foregoing difficulties and disadvantages by providing an electrically operated cigarette lighter which heats an element to a sufficient temperature for lighting a cigarette without producing an open flame. The lighter will operate in a high wind and will not produce dangerous flames or blow out as is common with conventional cigarette lighters. The lighter operates only when physical contact is made between the cigarette and the heater element. No manually operable switch is required. The lighter employs no expensive or troublesome fuel. A battery supplies energy to operate the lighter.

It is therefore one object of the invention to provide an electrically operated cigarette lighter which is battery powered, the lighter including a heater element supported by a member in circuit with one electrode of the battery and positioned to be moved against spring tension into contact with the other electrode for energizing and heating the element.

A further object is to provide a cigarette lighter including a heater element suspended by spring means out of contact with one electrode of a battery but electrically in circuit with the other electrode the heater element being movable in response to pressure of an applied cigarette to close the electric circuit and cause the heater element to be heated for lighting the cigarette.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of one cigarette lighter embodying the invention.

Fig. 2 is a vertical transverse sectional view of the lighter taken on line 2—2 of Fig. 1.

Fig. 3 is a vertical longitudinal sectional view taken on line 3—3 of Fig. 2.

Fig. 4 is a perspective view of a heater and contact element assembly employed in the lighter.

Fig. 5 is a top plan view of another form of lighter embodying the invention.

Fig. 6 is a vertical sectional view taken on line 6—6 of Fig. 5.

Fig. 7 is an exploded perspective view of the several components of the lighter of Figs. 5 and 6.

Fig. 8 is a view similar to Fig. 4 showing a modified form of heater element.

Referring to the drawings, there is shown in Figs. 1–4 a lighter 10 including an outer case 12 formed of some insulation material such as plastic. The case is generally rectangular in form like an open top box. At its open end the case is formed with outwardly flaring ends and sides 14, 16. The case has flat end walls 15, side walls 18, and a closed bottom 20. Disposed in the case and snugly and frictionally fitted against the side walls 18 is a rectangularly battery 22. This battery has a centrally and vertically disposed positive electrode 24 covered by a metal cap 25 extending above the top surface of the battery. The battery includes a metal housing 28 filled with a paste 30 containing an electrolyte. The metal housing serves as the negative electrode of the battery. A plastic insulation plate 32 is disposed at the top of the battery closing the housing.

A metal member in the form of a U-shaped frame 34 removably receives the battery. The flat bottom or bight 35 of the frame seats on the bottom 20 of the case 12. The flat arms 38 of the frame fit frictionally between the end walls 15 of the case and the end walls of the housing 28. The upper ends of arms 38 extend beyond the top of the battery and are free of the end walls 15. These ends are formed with indentations 36 which engage the top rim of the battery at opposite ends and prevent the battery from moving upwardly within the frame 34. The ends of the arms 38 are crimped at 40 and secure thereby the opposite ends of an electrical resistance heater element in the form of a coil spring 42. The coil spring is disposed horizontally, its axis being parallel to the bottom of the frame and case. The coil spring is normally spaced a short distance from the metal cap 25. The coil spring may take the form of a spiral spring as indicated at 42' in Fig. 8.

The coil spring is also spaced from the open flared end of the case 12. Thus a cigarette C as indicated by dotted lines in Fig. 3 must be inserted into the case to press against the spring. It will be noted that the spring is electrically in direct circuit with the metal housing 28 through the metal frame 34 which contacts the housing.

When the cigarette is pressed against the spring so that the spring contacts the metal cap 25, two parallel electrical circuits are closed through the respective halves of the spring. The spring becomes hot upon passage of electric current therethrough and ignites the cigarette. When the cigarette is withdrawn, the tensioned spring is released and reassumes its normal spacing from metal cap 25 as shown in Figs. 2 and 3. While the cigarette is being lighted, its igniting end is disposed within the casing so that it will light even in a high wind. The heater element itself serves as a switching element operable responsive to physical contact with the cigarette to close the electric circuits which energize the heater element.

In the form of the invention shown in Figs. 5–7, lighter 10ª is provided with a case including a rectangular tubular member 44 open at both ends. The outer ends of the end walls 46 and side walls 48 may be formed with ribbing or corrugations 50 which engage with ribbing or corrugations 52 formed inside the walls of a rectangular cap 54 removably fitted on the lower end of the casing member 44. A rectangular metal frame 56 supports a flat rectangular electrical resistance heater element 58. The element is welded to 60 to spaced top end portions 61 of the frame. Rectangular battery 22 many be fitted within the frame and will be held in place on the bottom 35ᵃ and side arms 38ᵃ by indentations 36ᵃ. The frame 56 is preferably formed of flexible springy metal so that the top portions can flex when pressure is applied perpendicular to the element 58. The element 58 is normally spaced from the metal cap 25 of the battery 22 as shown in Fig. 6. When cigarette C' is applied to the element it contacts the metal cap, closing two parallel electrical circuits between the metal cap 25 and metal battery housing 28 via the heater element, end portions 61 of the frame and the side arms 38ᵃ. A groove 65 is formed in the inner side of each end wall 46 for receiving the side arms 38ᵃ of the frame and preventing lateral or vertical movement of the frame and battery in the case. A plastic cover 66 is provided for the open top end of the casing member 44. The cover is formed with a central opening 68 in line with the element 58. The wall of the opening is curved and tapered to facilitate entrance of a cigarette C'.

The element 58 is normally spaced from the open end of the case as shown in Fig. 6 so that the cigarette must be inserted into the case to light it. When the element 58 is pressed into contact with the metal cap 25ᵃ, the element is quickly heated and the cigarette is lighted. The frame 56 itself acts as the spring support for the rigid element 58 in contrast with the structure of lighter 10 in which the element 42 itself is in the form of a coil spring. The lighted 10ᵃ is assembled by inserting the battery enclosed in frame 56 into member 44 and then snapping on cap 54.

There has thus been provided according to the invention, a lighter including an electrical means for lighting a cigarette without liquid or solid fuel to avoid emitting fumes of fuel combustion. No manually operable switch means is employed. The lighter operates only when a cigarette is placed in physical contact with it. The only part which is consumed in use is the battery, which has a long life but can easily be replaced when desired by removing the insert including the battery and its associated frame from the case.

It is to be understood that the shape, size, and surface ornamentation of the cigarette lighter may be changed if desired.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An electric cigarette lighter comprising a casing having an open end, a U-shaped electrically conductive frame removably inserted in said casing, said frame including flat arms and a bight portion, an electrical resistance heater element in the form of a coil spring supported between ends of the arms of said frame, a battery inserted between said arms of the frame, said battery having a metal housing, an electrode in the form of a metal housing in contact with said arms, said battery having another electrode, said arms being formed to hold the battery in the frame so that said other electrode is normally spaced from said spring, whereby said spring will contact said other electrode when a cigarette is pressed against the spring.

2. An insert for a cigarette lighter, comprising a U-shaped flat metal frame, said frame including arms and a bight portion, a coil spring secured between ends of the arms of the frame and axially disposed parallel to the flat bight thereof, said arms being formed with indentations for removably securing a battery between said arms with an electrode of the battery spaced from said spring.

3. An insert for a cigarette lighter comprising a U-shaped flat metal frame, said frame including arms and a bight portion, an electrical resistance heater element supported between ends of the arms of said frame, said element being disposed parallel to the flat bight of the frame, said arms being formed with indentations for removably securing a battery between said arms with an electrode of the battery spaced from said element, said element being movable to contact against spring tension to contact said electrode.

4. An electric cigarette lighter comprising a casing having an open end, an electrically conductive frame removably inserted in said casing, and an electrical resistance heater element supported by said frame, said frame being adapted to receive a battery having positive and negative electrodes, with one of the electrodes in contact with said frame and with the other electrode normally spaced from said element, said element being movable against spring tension into contact with said other electrode to close an electric circuit with said one electrode through said frame, said casing being formed with a tubular member having a cap removably secured on the other end of the casing, said frame being formed from a flat spring metal strip bent to rectangular form and having free ends secured to ends of said element.

5. An electric cigarette lighter comprising a casing having an open end, a U-shaped electrically conductive frame removably inserted in said casing, claims including flat arms and a bight portion, an electrical resistance heater element in the form of a coil spring supported between ends of the arms of said frame, a battery inserted between said arms of the frame, said battery having a metal housing, an electrode in the form of a metal housing in contact with said arms, said battery having another electrode, said arms being formed to hold the battery in the frame so that said other electrode is normally spaced from said spring, whereby said spring will contact said other electrode when a cigarette is pressed against the spring, said open end of the casing being formed with outwardly flaring sides for receiving a cigarette therein to press against said element for heating the same and lighting the cigarette.

6. An insert for a cigarette lighter comprising a U-shaped flat metal frame, said frame including arms and a bight portion, an electrical resistance heater element supported between ends of the arms of said frame, said element being disposed parallel to the flat bight of the frame, said arms being formed with indentations for removably securing a battery between said arms with an electrode of the battery spaced from said element, said element being movable to contact against spring tension to contact said electrode, said frame constituted by a flat strip of springy metal, said element being a spiral spring.

7. An electric cigarette lighter comprising a casing having an open end, an electrically conductive frame removably inserted in said casing, and an electrical resistance heater element supported by said frame, said frame being adapted to receive a battery having positive and negative electrodes, with one of the electrodes in contact with said frame and with the other electrode normally spaced from said element, said element being movable against spring tension into contact with said other electrode to close an electric circuit with said one electrode through said frame, said casing constituted by a tubular member having a cap removably secured on the other end of the casing, said frame constituted by a flat spring metal strip bent to rectangular form and having free ends secured to ends of said element, said casing having inner walls formed to prevent said frame from moving laterally in the casing or moving longitudinally out of the casing through said open end.

8. An electric cigarette lighter comprising a casing having an open end, an electrically conductive frame removably inserted in said casing, and an electrical resistance heater element supported by said frame, said frame being adapted to receive a battery having positive and negative electrodes, with one of the electrodes in contact with said frame and with the other electrode normally spaced from said element, said element being movable against spring tension into contact with said other electrode to close an electric circuit with said one electrode through said frame, said casing constituted by a tubular member having a cap removably secured on the other end of the casing, said frame constituted by a flat spring metal strip bent to rectangular form and having free ends secured to ends of said element, said casing having grooves in inner surfaces of opposed walls thereof to receive end walls of said frame and to prevent the frame from moving laterally in the casing or moving longitudinally out of the casing through said open end.

9. An electric cigarette lighter comprising a casing having an open end, an electrically conductive frame removably inserted in said casing, and an electrical resistance heater element supported by said frame, said frame being adapted to receive a battery having positive and negative electrodes, the negative electrodes, the negative electrode being in contact with said frame, the positive electrode normally spaced from said element, said element being movable against spring tension into contact with said positive electrode to close an electric circuit with said negative electrode through said frame, said casing constituted by a tubular member having a cap removably secured on the other end of the casing, said frame constituted by a flat spring metal strip bent to rectangular form and having free ends secured to ends of said element, and a removable cover on the open end of the casing, said cover having a central opening to receive a cigarette.

References Cited in the file of this patent

UNITED STATES PATENTS

| | | |
|---|---|---|
| 2,052,016 | Davis | Aug. 25, 1936 |
| 2,166,657 | Evelyn | July 18, 1939 |
| 2,535,665 | Boyarsky et al. | Dec. 26, 1950 |

FOREIGN PATENTS

| | | |
|---|---|---|
| 626,494 | Great Britain | July 15, 1949 |